United States Patent
Dokmanic et al.

(10) Patent No.: US 9,945,946 B2
(45) Date of Patent: Apr. 17, 2018

(54) ULTRASONIC DEPTH IMAGING

(71) Applicant: MICROSOFT TECHNOLOGY LICENSING, LLC, Redmond, WA (US)

(72) Inventors: Ivan Dokmanic, Lausanne (CH); Ivan J. Tashev, Kirkland, WA (US); Thomas M. Soemo, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 681 days.

(21) Appl. No.: 14/484,128

(22) Filed: Sep. 11, 2014

(65) Prior Publication Data

US 2016/0077206 A1   Mar. 17, 2016

(51) Int. Cl.
| G01S 15/88 | (2006.01) |
|---|---|
| G01S 15/89 | (2006.01) |
| G01S 3/74 | (2006.01) |
| G01S 7/526 | (2006.01) |

(52) U.S. Cl.
CPC ............... G01S 15/89 (2013.01); G01S 3/74 (2013.01); G01S 7/526 (2013.01)

(58) Field of Classification Search
USPC ....................................................... 367/99
See application file for complete search history.

(56) References Cited

U.S. PATENT DOCUMENTS

| 6,018,317 | A | * | 1/2000 | Dogan | G01S 3/74 342/373 |
|---|---|---|---|---|---|
| 7,415,117 | B2 | * | 8/2008 | Tashev | H04R 3/005 367/119 |
| 7,639,565 | B2 | * | 12/2009 | Bernecky | G01S 3/8083 367/131 |
| 7,901,358 | B2 | | 3/2011 | Mehi et al. | |
| 8,098,842 | B2 | * | 1/2012 | Florencio | H04R 3/005 367/119 |
| 8,120,993 | B2 | * | 2/2012 | Amada | G01S 3/8034 367/118 |
| 8,229,134 | B2 | * | 7/2012 | Duraiswami | H04R 1/406 348/462 |
| 8,235,906 | B2 | | 8/2012 | Madore | |

(Continued)

OTHER PUBLICATIONS

Orchard, et al., "Discriminating Multiple Nearby Targets Using Single-Ping Ultrasonic Scene Mapping", In IEEE Transactions on Circuits and Systems I: Regular Papers, vol. 57, Issue 11, Nov. 2010, pp. 2915-2924.

(Continued)

*Primary Examiner* — Isam A Alsomiri
*Assistant Examiner* — Jonathan D Armstrong
(74) *Attorney, Agent, or Firm* — Alleman Hall Creasman & Tuttle LLP

(57) ABSTRACT

Examples are disclosed herein that relate to depth imaging techniques using ultrasound One example provides an ultrasonic depth sensing system configured to, for an image frame, emit an ultrasonic pulse from each of a plurality of transducers, receive a reflection of each ultrasonic pulse at a microphone array, perform transmit beamforming and also receive beamforming computationally after receiving the reflections, form a depth image, and output the depth image for the image frame.

19 Claims, 7 Drawing Sheets

(56) References Cited

U.S. PATENT DOCUMENTS

| | | | |
|---|---|---|---|
| 8,323,106 B2 | 12/2012 | Zalewski | |
| 8,693,287 B2* | 4/2014 | Nakadai | G01S 3/8006 367/124 |
| 9,042,573 B2* | 5/2015 | Åhgren | G01S 3/8006 381/92 |
| 9,482,736 B1* | 11/2016 | Ray | G01S 3/808 |
| 2004/0091119 A1* | 5/2004 | Duraiswami | H04S 1/002 381/26 |
| 2007/0092016 A1* | 4/2007 | Cheng | H04L 27/2601 375/260 |
| 2008/0144752 A1* | 6/2008 | Zhou | H04B 7/0854 375/347 |
| 2008/0181325 A1* | 7/2008 | Park | H04L 25/0204 375/260 |
| 2012/0069714 A1* | 3/2012 | Nakadai | G01S 3/8006 367/125 |
| 2013/0041648 A1 | 2/2013 | Osman | |
| 2013/0070104 A1 | 3/2013 | Hu et al. | |
| 2014/0078867 A1* | 3/2014 | Nakamura | G01S 3/802 367/118 |
| 2014/0121502 A1 | 5/2014 | Vignon et al. | |
| 2014/0140600 A1 | 5/2014 | Daigle | |
| 2015/0226831 A1* | 8/2015 | Nakamura | G01S 3/8006 367/118 |

OTHER PUBLICATIONS

Wilson, et al., "Audio-Video Array Source Localization for Intelligent Environments", In International Conference on Acoustics, Speech, and Signal Processing, vol. 2, May 5, 2002, pp. 2109-2112.

Seitz, et al., "A Comparison and Evaluation of Multi-View Stereo Reconstruction Algorithms", In IEEE Computer Society Conference on Computer Vision and Pattern Recognition, vol. 1, Jun. 17, 2006, 8 pages.

Schuon, et al., "High-quality scanning using time-of-flight depth superresolution", In IEEE Computer Society Conference on Computer Vision and Pattern Recognition Workshops, Jun. 23, 2008, 7 pages.

Schwarz, Brent., "Mapping the world in 3D", In proceedings of Nature Photonics, Jul. 9, 2010, 2 pages.

Kirman I, et al., "Exploiting sparsity in time-of-flight range acquisition using a single timeresolved sensor", In Proceedings of n Proceedings of Optics Express, vol. 19, Issue 22, Oct. 17, 2011, 23 pages.

Moebus, et al., "Three-Dimensional Ultrasound Imaging in Air using a 2D Array on a Fixed Platform", In IEEE International Conference on Acoustics, Speech and Signal Processing, vol. 2, Apr. 15, 2007, pp. 961-964.

Moebus, et al., "Parametrization of acoustic images for the detection of human presence by mobile platforms", In IEEE International Conference on Acoustics Speech and Signal Processing, Mar. 14, 2010, pp. 3538-3541.

Mlyake, et al., "A study on acoustic imaging based on beamformer to range spectra in the phase interference method ", In Proceedings of Meetings on Acoustics vol. 19, No. 1, Jun. 2, 2013, 3 pages.

Strakowsk, et al., "An ultrasonic obstacle detector based on phase beamforming principles", In IEEE Sensors Journal, vol. 6, Issue 1, Feb. 2006, pp. 179-186.

Harput, et al., "Ultrasonic Phased Array Device for Acoustic Imaging in Air", In IEEE Sensors Journal, vol. 8, Issue 11, Nov. 2008, pp. 1755-1762.

Trees, Harry L. Van, "Optimum Array Processing (Part IV of Detection, Estimation, and Modulation Theory)", May 10, 2002, Available at: http://onlinelibrary.wiley.com/book/10.1002/0471221104.

Tashev, Ivan Jelev, "Sound Capture and Processing, Practical Approaches", In Wiley; 1 edition, Aug. 17, 2009, 8 pages.

Schmidt, Ralph O., "Multiple emitter location and signal parameter estimation", In IEEE Transactions on Antennas and Propagation, vol. AP-34, No. 3, Mar. 1986, pp. 276-280.

Dokmanic, et al., "Hardware and Algorithms for Ultrasonic Depth Imaging", In IEEE International Conference on Acoustics, Speech, and Signal Processing, May 9, 2014, 5 pages.

\* cited by examiner

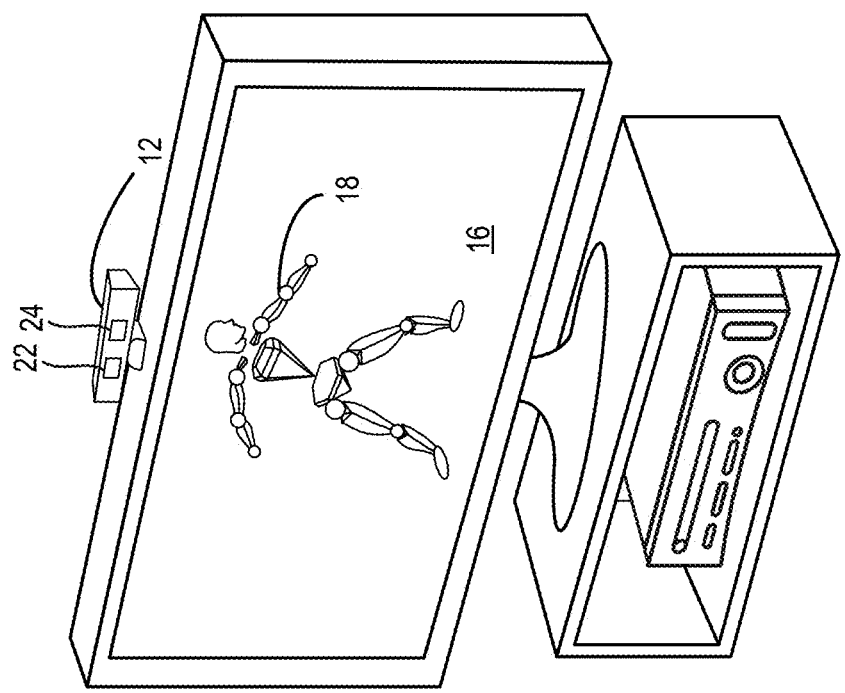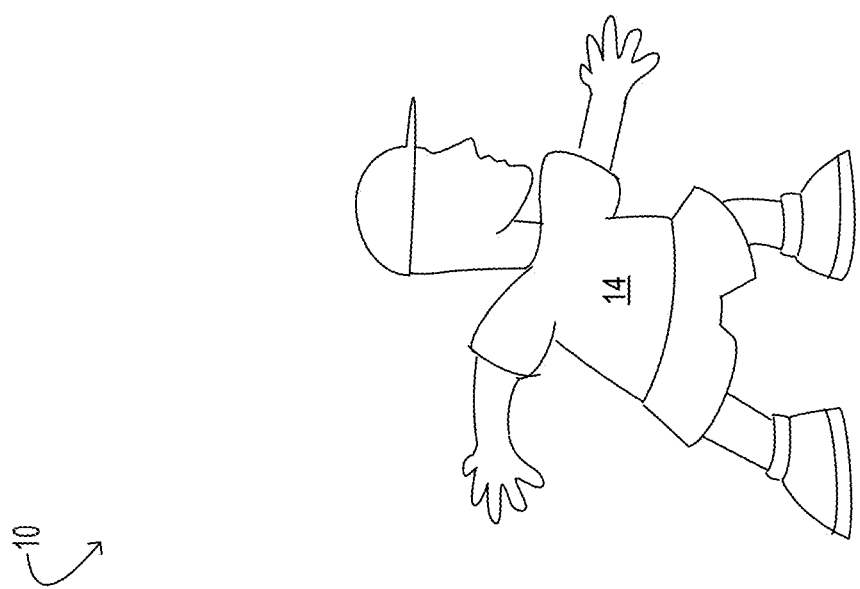
FIG. 1

ULTRASONIC DEPTH IMAGING

BACKGROUND

Depth imaging may have many applications, including but not limited to uses in motor vehicles, surveying, computer vision, robotics, and human-computer interactions. Depth imaging may be based on light, such as infrared light or visible light. Light-based depth imaging techniques may include the use of multiple cameras to capture images of a scene from different perspectives, as well as structured light and time-of-flight depth imaging techniques.

SUMMARY

Examples are disclosed herein that relate to depth imaging techniques using ultrasound. One example provides an ultrasonic depth sensing system configured to, for an image frame, emit an ultrasonic pulse from each of a plurality of transducers, receive a reflection of each ultrasonic pulse at a microphone array, perform transmit beamforming and also receive beamforming computationally after receiving the reflections, form a depth image, and output the depth image for the image frame.

Another example provides a method of ultrasonic depth sensing including performing beamforming to detect one or more echoes from a direction determined by the beamforming, and for a selected echo, performing sound source localization using a reflection corresponding to the selected echo. The method further includes comparing a direction determined by the sound source localization to the direction determined by the beamforming, assigning a depth value determined for the selected echo to a pixel of a depth image if the direction determined by the sound source localization is within a threshold distance of the direction determined by the beamforming, and outputting the depth image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 shows an example use environment for an ultrasonic depth sensing camera.

DETAILED DESCRIPTION

Figure 2:
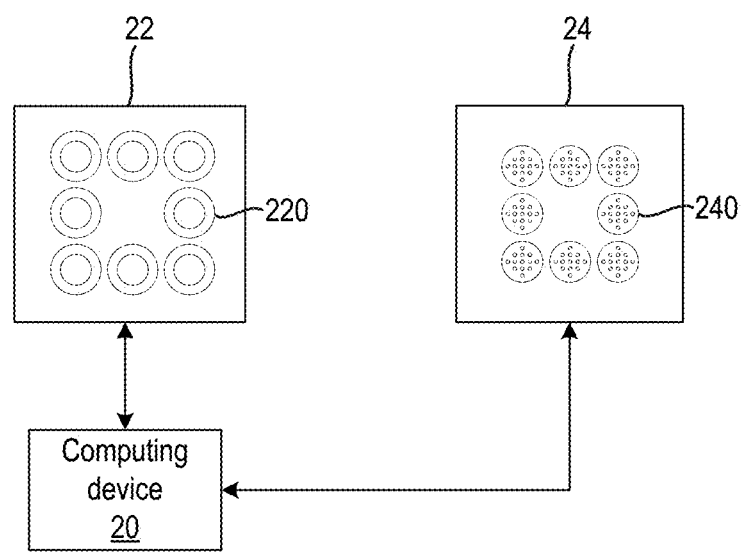
FIG. 2 shows a schematic depiction of an example ultrasonic depth imaging system.

As mentioned above, depth imaging may be based on optical techniques such as stereo imaging, structured light depth sensing, and time of flight depth sensing. However, such depth imaging systems, when operating at sufficiently high sampling frequencies to track the motion of objects in a scene, may use significant amounts of power. Accordingly, examples are disclosed that relate to ultrasonic depth sensing. Depth imaging using ultrasonic waves may offer relatively lower power consumption than light-based methods. Further, ultrasonic depth imaging may complement the use of light-based depth sensing in scenarios where light fails to image certain objects properly, for example mirrors, windows, glass walls, or when imaging through thin fabrics or spaces filled with smoke.

Ultrasonic depth sensing may utilize transmit beamforming that concentrates sound energy emitted by an array of transducers (e.g. piezoelectric transducers) in a selected angular direction, and also may utilize receive beamforming that narrows a directional range from which an array of microphones receives reflected sound. Such beamforming techniques may allow the emitted and reflected sounds to be localized to angular regions of space (relative to the transducers and receivers), and thus allow the acquisition of a depth image on a pixel by pixel basis. However, scanning a sufficient number of angular directions to obtain a depth image of any suitable resolution using such transmit beamforming may be unduly slow. For example, it may take at least 20 seconds to scan a single frame for an image of 900 angular depth pixels using such transmit beamforming in cases where it is desired to image depths of 4 meters from the transducers and receivers. Such frame rates may be much too low to track object motion within the imaged scene.

One method of increasing the frame rate of an ultrasonic depth camera may be to utilize a single transducer, and thus not utilize transmit beamforming. However, with this solution, significant sound energy may be directed in undesired locations, which may increase noise arising from reflections of sound by surfaces in those undesired directions.

Thus, examples are disclosed that perform both transmit and receive beamforming after the receipt of reflected signals. As described in more detail below, these examples may enable the performance of transmit beamforming for a potentially large array of pixels via the emission of a much lower number of ultrasonic pulses, such as by emission of a single pulse from each transducer. This may allow the acquisition of depth images to be performed at a frame rate that may enable the real-time tracking of motion within the imaged scene, yet while still permitting the directional concentration of sound energy provided by transmit beamforming.

Another issue that may be encountered with ultrasonic depth imaging may arise from specular reflections from surfaces in an imaged scene. The center lobe of a transmit beam (e.g. a directional sound beam formed by transmit beamforming) may be relatively wide, and a considerable amount of energy may also be transmitted into side lobes of a transmit beam. Thus, reflections may be received from directions other than a direction of the formed audio beam. Further, specular reflections from strong reflective surfaces located at directions other than the beam direction may have a much higher intensity than reflections from a surface in the beam direction, which may result in the determination of inaccurate depth values for that angular direction.

Accordingly, examples are disclosed that utilize sound source localization (SSL) methods to help distinguish reflections arising from objects in a desired direction and noise arising from specular reflections received from other directions. As described in more detail below, these examples may mitigate the effect of specular reflections by determining which reflections of multiple reflections received for a receive beam direction arise from the receive beam direction, thereby allowing reflections coming from directions other than the beam direction to be ignored.

FIG. 1 shows an example use environment 10 for an ultrasonic depth imaging system 12, and illustrates the ultrasonic depth sensing system being used to image a human target 14. Use environment 10 also may include a display device 16 being used to visually present an avatar 18 that represents human target 14 as imaged by the ultrasonic depth imaging system. The ultrasonic depth sensing system includes a transducer array 22 and also a receiver array (e.g. a microphone array) 24. While FIG. 1 illustrates the ultrasonic depth sensing system in the form of a set-top sensor system used in a home entertainment environment, it will be understood that an ultrasonic depth sensing system as disclosed herein may be used in any other suitable use environment. For example, an ultrasonic depth sensing system may be incorporated into a portable computing device, such as a mobile communication device. The use of an ultrasonic depth sensing system as disclosed herein in such a portable device may help to preserve battery life compared to the use of an optical depth sensing system, due to the potentially lower power usage of an ultrasonic depth sensing system as disclosed herein compared to light-based systems.

Transducer array 22 is configured to output ultrasonic signals from each transducer of a plurality of transducers. Traditional transmit beamforming may be performed by varying the timing/phase and/or power of the output signals at any given frequency to constructively interfere the signals at desired angular directions in the volume to be imaged. However, as described in more detail below, the disclosed examples also may utilize transmit beamforming performed after receiving the reflections of sounds produced by the plurality of transducers, which may allow for higher frame rates.

Receiver array 24 is configured to receive reflected sounds at a plurality of microphones. As described below, receive beamforming may be performed by determining, for each angular pixel, a relative timing or phase at which reflections arising from that angular pixel are received at each microphone. Further, as described in more detail below, SSL may be used to help ensure that detected echoes from a receive beamform direction arise from surfaces in that direction, and not from specular reflections from surfaces in other directions.

FIG. 2 shows schematic views of non-limiting example configurations of transducer array 22 and receiver array 24. In FIG. 2, transducer array 22 is depicted as comprising eight transducers 220 and receiver array 24 as comprising eight microphones 240. Both arrays are arranged in a generally square pattern, but any suitable number of transducers or microphones may be used, and may be arranged in any suitable pattern.

An arrangement of transducers or microphones to be used for a beamformer array may be determined in any suitable manner One example is as follows. In transmit beamforming, a transducer array outputs ultrasonic signals from each transducer by varying the timing and/or power, or weights, of the signals. By using a fixed set of weights to combine the transmitted signals, the transducers may transmit the signals in a pattern that constructively interferes in a beam direction and is suppressed in other directions. For example, given a set of M transducers at positions $\{p_m\}_{m=1}^{M}$, their weights may be expressed for a minimum-variance-distortionless-response beamformer as follows.

$$W_{\Omega_c}(f) = \frac{\Phi_{NN}^{-1}(f)D_{\Omega_c}(f)}{D_{\Omega_c}^*(f)\Phi_{NN}^{-1}(f)D_{\Omega_c}(f)}$$

In this expression, $\Omega_c=(\theta_c, \varphi_c)$ indexes the elevation and the azimuth of a look-up point corresponding to an angular direction of the beam, $D_{\Omega_c}(f)$ represents the vector of transfer functions from the look-up point to the microphone array, and $\Phi_{NN}(f)$ represents the noise cross-power spectrum which may be diagonally loaded with the microphone self-noise and representation of the manufacturing tolerances. Assuming a far-field regime (so that the look-up points lie on a sufficiently large sphere), the transducer array's output may be computed as $R_{\Omega_c}(f)=W^*_{\Omega_c}(f)X(f)$, which may be equivalent to the output of a single microphone with the directivity pattern $B(f, \Omega_T)=W^*_{\Omega_c}(f)D_{\Omega}(f)$ at the center of the array. The directivity index for the direction $\Omega_T$ may be defined as:

$$di(f) = \frac{|B(f, \Omega_T)|}{\frac{1}{4\pi}\int_0^\pi \int_0^{2\pi} |B(f, \Omega_T)|^2 \, d\Omega}$$

or, expressed in dB, $DI(f)=10 \log_{10}[di(f)]$. Thus, the total directivity index that represents the directivity over all frequencies of interest may be expressed as follows.

$$DI_{tot}=10 \log_{10}\int_{f_1}^{f_2} di(f) df$$

In the scanning mode, pulses are emitted toward each angular direction, and the time it takes for a pulse from that angular direction to reflect back and arrive is measured. To achieve a desired resolution, and to reduce effects arising from beam width, it may be desirable to use a suitably narrow beam at all frequencies of interest. The beam narrowness is quantified through the directivity index. Varying the transducer positions $\{p_m\}_{m=1}^{M}$ may allow the achievement of a desired beam narrowness in terms of $DI_{tot}$ or any other suitable figure of merit.

The determination of array element positions may be constrained by factors such as a number of array elements, hardware design constraints (e.g. element size, such as transducer size), and design choices (e.g. the use of symmetric geometries). Searching over different parametric geometry classes, such as cross, circle, square, and double square, and varying the distance between the array elements may allow the determination of realizable geometries with desired beam directivity.

In the specific example of FIG. 2, in which each array has eight elements, a square microphone array with a spacing of 6.5 mm between microphones may yield a suitable $DI_{tot}$ value. For the depicted transducer array, a smallest mechanical spacing permissibly by the transducer form factor may be used. As piezoelectric transducers may be directive, each element may have a degree of tilt from the main axis (e.g. normal to an average tilt and originating at the center of the array) in order to achieve a suitably uniform beam profile over the target range of angles. In one implementation, a tilt angle of twenty degrees with respect to the main axis may be used. It will be understood that these specific values are presented for the purpose of example, and are not intended to be limiting in any manner.

As mentioned above, some methods of performing transmit beamforming may involve varying the output of traducers to directionally emit sound for each angular pixel of a depth image. However, due to the speed at which sound travels, using such beamforming to raster scan a sufficient number of angular pixels to form a depth image by listening for echoes may take a significant amount of time, which may result in low frame rates.

Thus, to achieve a higher frame rate while still performing transmit beamforming, the transmit beamforming may be performed post-receipt of the reflected signals. This may allow acquisition of depth images to be performed at higher frame rates compared to other forms of transmit beamforming.

Figure 3:
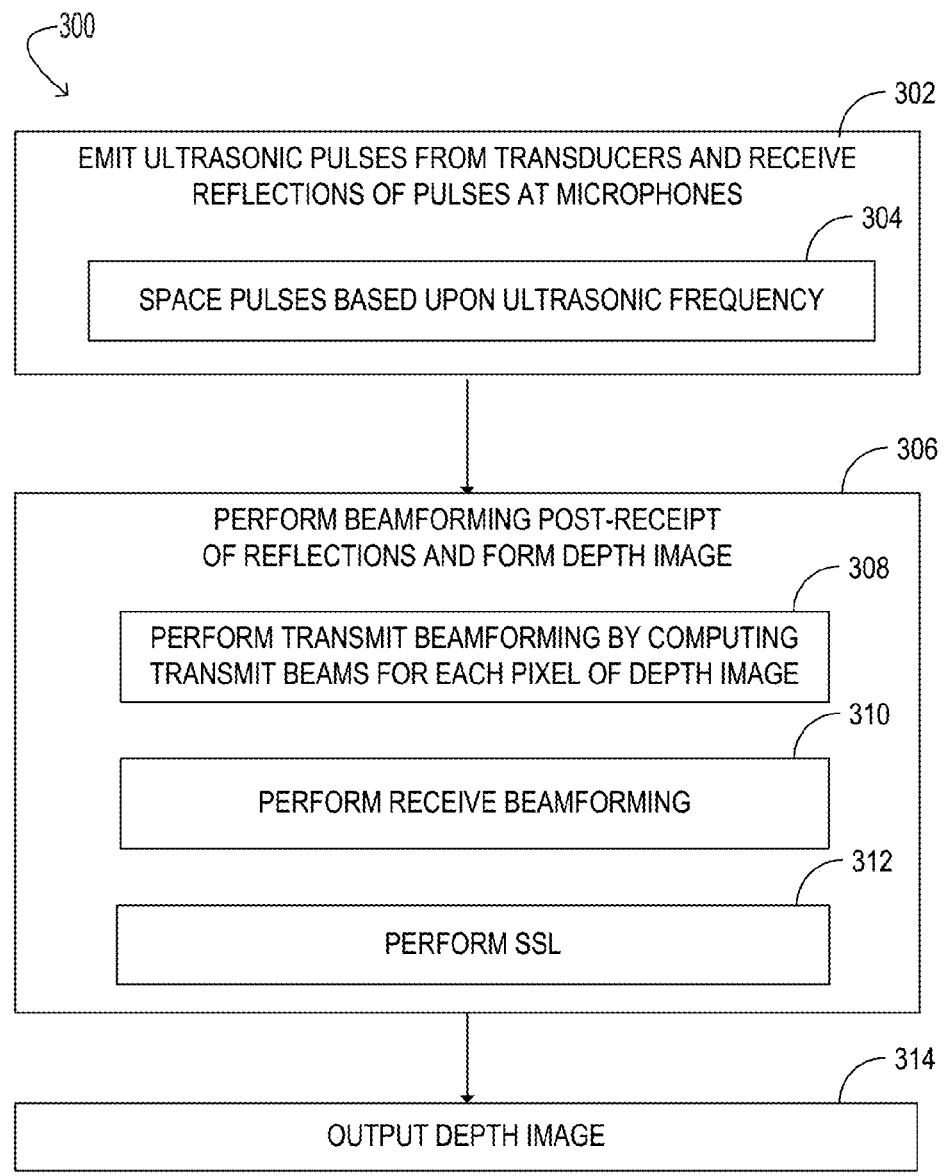
FIG. 3 shows a flow diagram illustrating an example method of beamforming that may be utilized in the ultrasonic depth imaging system of FIG. 2.

FIG. 3 shows a flow diagram depicting an example method 300 for depth imaging of an image frame, and illustrates performing transmit beamforming and receive beamforming post-receipt of the reflections of the ultrasonic pulses. Method 300 includes, at 302, emitting an ultrasonic pulse from each transducer in transducer array 22, and receiving a reflection of each ultrasonic pulse at receiver array 24. The pulses may be timed/spaced based upon the ultrasonic frequency of the pulses, as indicated at 304. Emitting the ultrasonic pulses from the transducer array in this manner may enable the performance of transmit beamforming after the receipt of the reflected pulses.

For example, denote the signal emitted by the ith transducer by $s_i(t)$, the signal received by the jth microphone by $r_j(t)$, and their Fourier transforms by $S_i(f)$ and $R_j(f)$, respectively. Let the total number of microphones in the microphone array be M, and the number of transducers in the transducer array K. Signals emitted by the transducers are all filtered versions of the same template pulse u(t), such that $s_i(t)=[w_i*u](t)$, where $w_i(t)$ is the impulse response of the beamforming filter corresponding to the ith transducer. For a delay-and-sum beamformer, the filters $w_i(t)$ are time delays, and may additionally include calibration filters that compensate for non-ideal source characteristics.

If $h_{ij}$ is the impulse response of an acoustic channel between the ith transducer and the jth microphone, then the reflection received by the jth microphone may be expressed as:

$$r_j(t) = \sum_{i=1}^{K} [h_{ij} * s_i](t) = \sum_{i=1}^{K} [h_{ij} * w_i * u](t)$$

or in the frequency domain:

$$R_j(f) = \sum_{i=1}^{K} H_{ij}(f) W_i(f) U(f)$$

Further, let $r_j^i(t)$ denote the reflection received by the jth microphone, if all the transducers except the ith one remain silent, and the ith transducer emits u(t) without passing it through the beamforming filter. Thus, $r_j^i(t)=[h_{ij}*u](t)$, and the reflection received by the jth microphone may be re-expressed as:

$R_j(f)=\sum_{i=1}^{K} W_i(f) R_j^i(f)$.

As $R_j^i(f)$ is known, then the transmit beamforming may be performed computationally at the receive end, without raster scanning as in the case of other transmit beamforming techniques. It will be noted that, in order to obtain a set of K M responses $\{R_j^i, j\in[1, M], i\in[1, K]\}$, K pulses may be emitted, where K is the number of transducers.

As such, post-receipt transmit beamforming as described herein may allow acquisition of an image frame with the use of a lower number of pulses compared to other methods of transmit beamforming. As an example comparison, with a transducer array having eight elements, a 30×30 pixel depth image may be acquired with the emission of just eight ultrasonic pulses (one for each sensor) utilizing post-receipt transmit beamforming as described herein. In contrast, performing transmit beamforming by raster scanning generated sound beams may utilize the emission of 900 separate beams to achieve this resolution. In this manner, post-receipt transmit beamforming may provide the benefit that scanning time does not scale with the resolution, such that any suitable target resolution may be acquired by emitting K pulses per image frame to reconstruct the transmit beams post-receipt.

Continuing with FIG. 3, method 300 comprises, at 306, performing beamforming after receipt of the reflections to form the depth image. Such beamforming may comprise, at 308, performing transmit beamforming at 308, as described above. Further, such beamforming also may comprise performing receive beamforming at 310.

In comparison with light-based techniques that utilize laser light for depth sensing, in which the transmitted energy is highly directional, acoustic beams may be less directional, even when utilizing relatively large numbers of transducers for transmit beamforming. As a result, a considerable amount of sound energy may be transmitted into side lobes of the beam, and the main lobe may be relatively wide. If there is a strong reflector in the scene, the reflection may appear to be coming from that strong reflector, as there may be some amount of acoustic energy transmitted in the direction of the reflector. Thus, even where receive beamforming is used, reflections from direction other than the beam direction may be received. Further, the strongest reflection may not arise from the beam direction where strongly specularly reflecting surfaces are in the environment.

Thus, to help address noise arising from such sources, beamforming may be combined with sound source localization methods to determine whether a sound is received from a receive beamforming direction, as indicated at 312 in FIG. 3. As one non-limiting example, for each beam direction, moments of multiple returned echoes/reflections may be detected. This signal may include both the transmit and the receive beamforming After determining the delays of returned echoes in the current beam, the delays may be compared to the raw, unbeamformed microphone signals, i.e. signals that did not pass through the receive beamforming filters, but are still concentrated on a part of the scene through transmit beamforming. Then, segments may be selected that correspond to the detected peaks, which may then be fed into a sound source localizer. Performing SSL on a selected echo detected by receive beamforming may allow for determining if the selected echo came from the same direction as the beam direction. In some examples, for each beam direction, a list of candidate distances may be created, corresponding to depth values of the selected echoes. In the instance where more than one reflection is received from the beam direction, any suitable method may be used to determine which reflection to use as a depth value for a pixel corresponding that direction. As one non-limiting example, a closest value may be selected.

Figure 4:
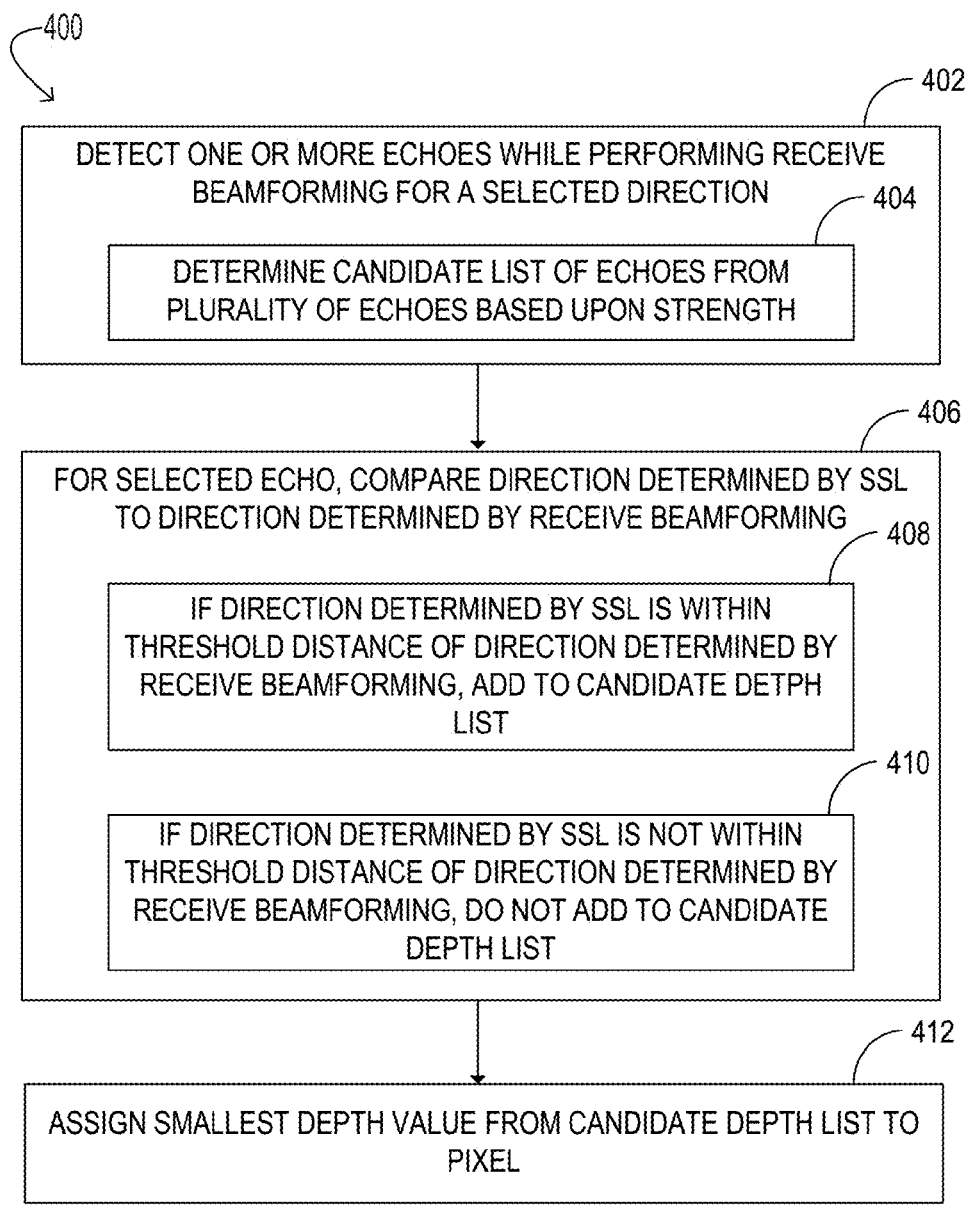
FIG. 4 shows a flow diagram illustrating an example method of sound source localization (SSL) that may be utilized in the ultrasonic depth imaging system of FIG. 2.

FIG. 4 shows a flow diagram illustrating a non-limiting example method 400 that may be performed as process 312 of FIG. 3. Inputs to method 400 may include, but are not limited to, such quantities as the set of transmit-beamformed signals received by microphones $\{R_m(f)\}_{m=1}^{M}$, a number of echoes per beam to consider P, a threshold for angular distance $d_{thr}$, and a SSL window duration T.

Figure 5:
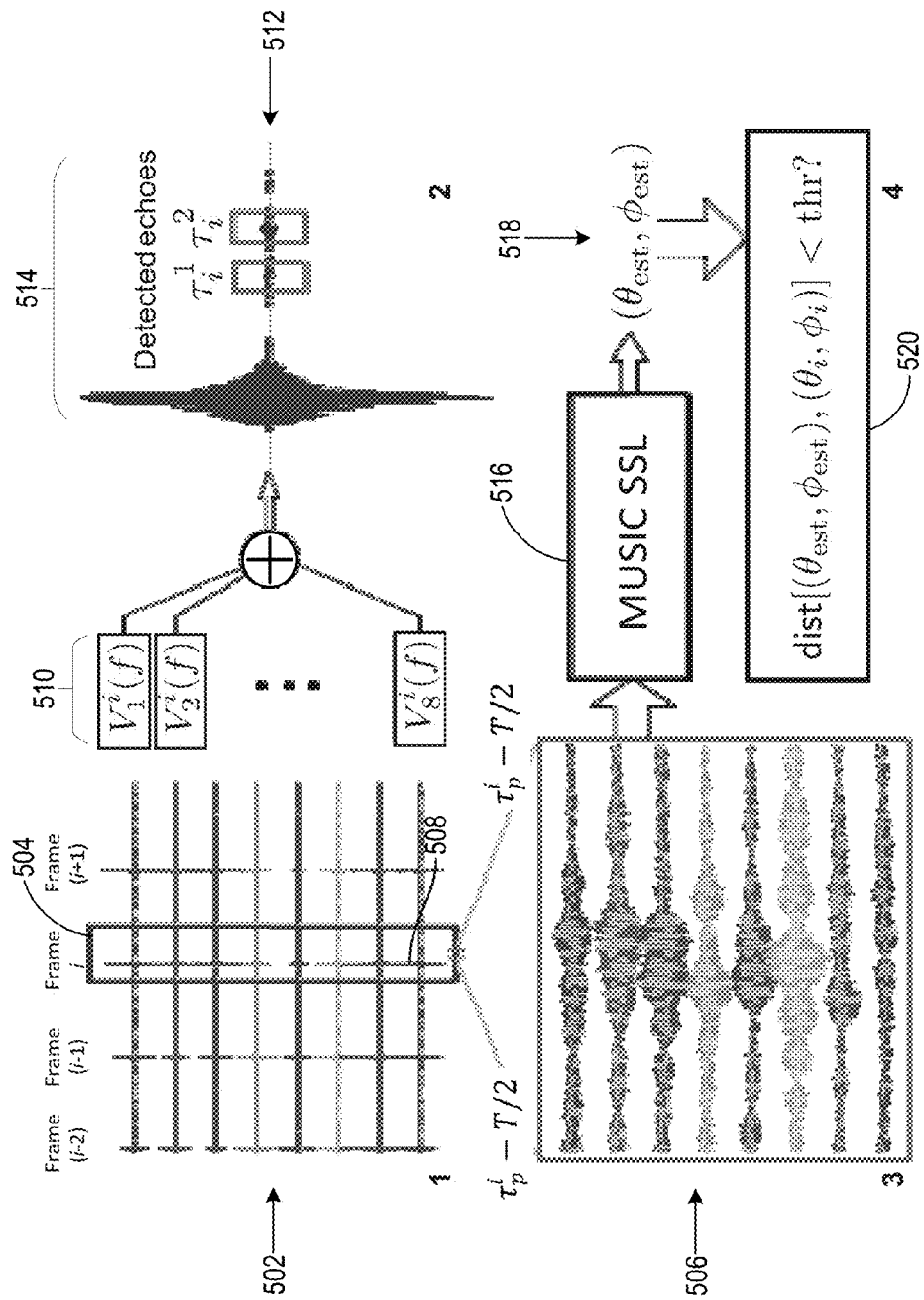
FIG. 5 shows a flow diagram illustrating an example method of ultrasonic depth sensing.

Method 400 comprises, for each receive beam, detecting one or more echoes while performing receive beamforming at 402 for a selected direction. FIG. 5 shows a graphical representation of the signals for each of eight microphones at 502, and also shows a magnified view of a portion 504 of the signals at 506, illustrating a plurality of echoes received from a transmitted pulse 508 for a frame i in a beam direction. Receive beamforming filters applied to the signals are shown as beamforming filters 510. Summing of the outputs of the beamforming filters yields a beamformed signal 512, which includes a plurality of detected echoes 514 for that receive beamforming direction.

The signals received at each of the microphones in a beam direction may be processed for SSL in any suitable manner. As one non-limiting example, the total beamformed signal corresponding to the ith beam of the beamforming may be expressed as:

$$X_j(f) = \sum_{m=1}^{M} V_m^i(f) R_m^i(f)$$

where $V_m^i(f)$ is the beamforming filter for the mth microphone and the ith beam. Signal $x_i(t)$ may be processed to identify one or more echoes by cross-correlating the echoes with the pulse template. A list of time delays corresponding to P strongest echoes may then be created, denoted as $\{\tau_p^i\}_{p=1}^{P}$, as indicated at 404. In this example, a candidate list of echoes is selected based upon strength of the echoes, but other characteristics may be used. Then, going back to the unbeamformed microphone signals $\{r_m^i(t)\}_{m=1}^{M}$, for a selected echo in the candidate list of echoes, segments of the microphone signals are extracted around the detected echo return times corresponding to depth values for that echo. The segments of the microphone signals may then be fed into a sound source localization algorithm, as indicated at 406, which outputs an estimate of the direction of arrival. FIG. 5 illustrates echoes 506 detected from a pulse being fed into a sound source localizer 516.

Continuing with FIG. 4, method 400 further comprises, at 406, comparing a direction determined by SSL to the direction determined by receive beamforming for the selected echo. At 408, if the direction determined by SSL is within a threshold distance of the direction determined by the beamforming, then method 400 comprises adding the depth value for that reflection to candidate list of depth values. Likewise, if the direction is not within a threshold distance of the direction determined by the beamforming, then method 400 comprises, at 410, not adding the depth value for that echo to the candidate list of depth values. Once the candidate list of depth values is determined, a depth value of the pixel may be selected from the one or more values on the candidate list of depth values for that pixel. As one non-limiting example, if two or more candidate depth values are on the list of candidate depth values, then a smallest depth value may be assigned to the pixel, as shown at 412.

Any suitable SSL method may be used. As one non-limiting example, the MUSIC (MUltiple SIgnal Classification) SSL technique may be used, and may be adapted to search in azimuth and elevation. In this example, for the strongest echoes p from 1 to P, the SSL algorithm is applied to $[r_m^i(\tau_p^i - T/2 : \tau_p^i + T/2)\}m=1M]$ to determine the azimuth and elevation $(\theta_{est}, \varphi_{est})$, shown at 518 in FIG. 5. If $\mathrm{dist}(\theta_{est}, \varphi_{est}), [\theta, \varphi])$ is within the threshold distance $d_{thr}$, shown at 520, then the time delay/distance of that echo is added to the candidate list $(D_i \leftarrow D_i \cup \{\tau_p^i/c\})$. Then, for all $D_i$, the pixel value $I_{SSL}^i$ is set to the smallest distance (min $D_i$). However, if the distance is outside of $[d_{min}, d_{max}]$, the pixel value is set to infinity.

Returning to FIG. 3, once values for each pixel in a depth image have been determined, method 300 further comprises, at 314, outputting the depth image for the image frame.

Figure 6:
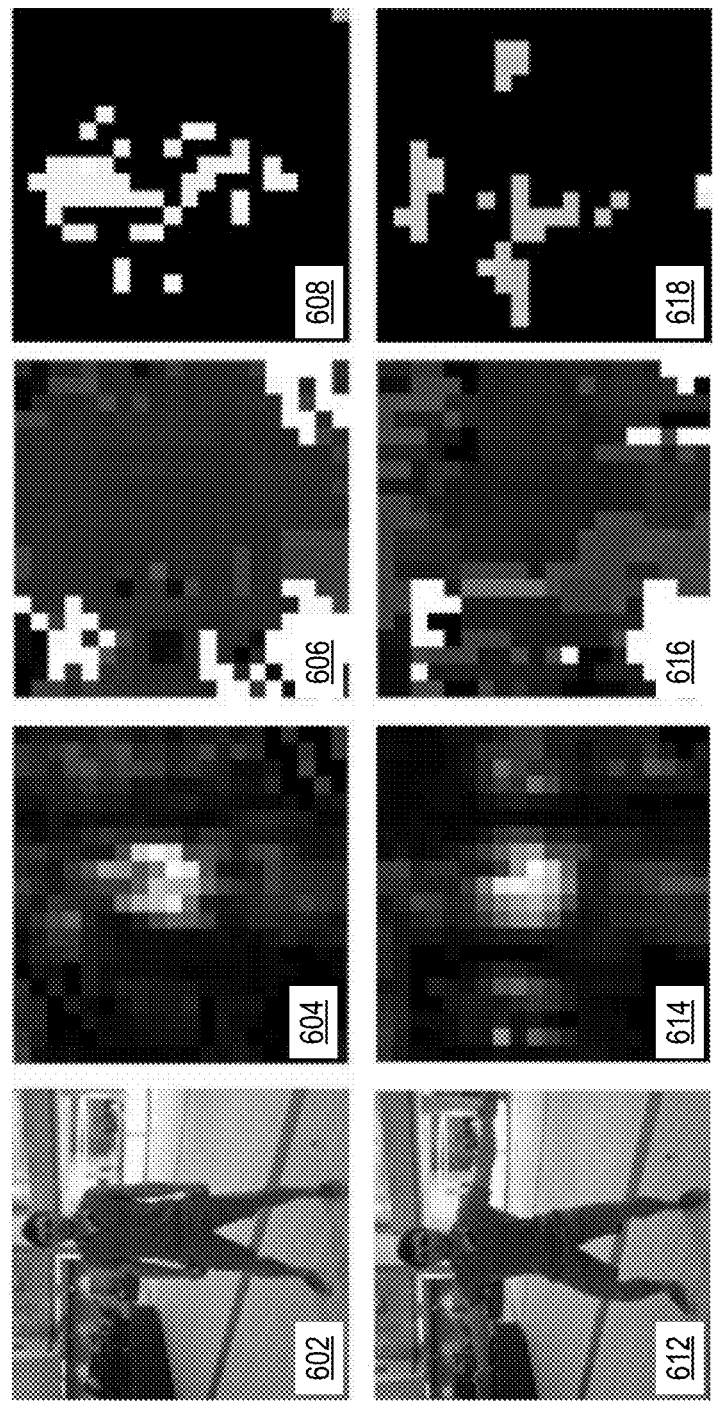
FIG. 6 shows example ultrasound images of a target object compared to a visible light image of the target object, and illustrates intensity, depth, and SSL-enhanced ultrasound depth images.

FIG. 6 shows example ultrasound images 600 of a target object captured using an example implementation of the ultrasonic depth imaging system as disclosed herein. In this experiment, eight Senscomp 40LT10 piezoelectric buzzers with diameters of 10 mm were arranged in the configuration described above with regard to FIG. 3. The transducers were operated at 40 kHz with a bandwidth where the signal may be attenuated by 10 dB relative to the maximum value. On the receive side, eight top-port MEMS microphones (Knowles SPM0406HE3H, available from the Knowles Corporation of Itasca, Ill.), also arranged in the configuration of FIG. 2, were used. The microphone signals were fed into a Presonus DigiMax D8 preamplifier (available from PreSonus Audio Electronics, Inc. of Baton Rouge, La.) and then into a MOTU 828mk3 Hybrid unit (available from MOTU of Cambridge, Mass.) operating at a sampling frequency of 192 kHz. Such an example implementation may achieve power of less than 100 mW, and potentially less than 10 mW. It will be understood that these specific elements, arrangements, and values are presented for the purpose of example, and are not intended to be limiting in any manner.

The images of FIG. 6 capture a human target standing approximately 2.5 meters from the ultrasonic imaging system in the example implementation as described above. At 602, the human has arms relaxed along the sides of the body, then at 612, with arms outstretched to the sides. Images 604 and 614 represent intensity images where the pixel value is proportional to the energy of the strongest echo received via beamforming for that pixel. The pixel value for the ith beam in this image may be computed as $$I_{int}^i = \int_{t_{max}-T/2}^{t_{max}+T/2} |x_i(t)|^2 dt$$

where $t_{max}$ is the time of the largest returned peak, and T is the window size for energy computation. For these specific images, the field of view was 60 degrees×60 degrees, and the angular resolution was 3 degrees. In 604, the body of the human target gives reflections corresponding to larger intensity values, represented by lighter pixels. In 614, the spread-arms pose may be observed, as shown by the lighter pixels, indicating that ultrasound may be used for acquiring intensity images of a human subject in a scene.

Images 606 and 616 of FIG. 6 show corresponding naïve depth images created by finding the time delay of arrival of the strongest returned pulse for each beam, wherein the term naïve indicates that SSL was not utilized. In these images, the pixel brightness is indicative of a detected depth value for that pixel. As discussed above, the strongest returned pulse may be coming from strong reflectors in the scene that are not necessarily in a beam direction. For example, it may be seen at 606 and 616 that most of the pixels are at the distance of the person, indicating a likelihood that reflections at those pixels actually arose from the person, even though the pixels may not correspond to a location of the person in the image.

Images 608 and 618 of FIG. 6 show SSL-enhanced depth images. Black pixels represent no echo received, while depth pixels are present where there is an object in the scene. The pixels in 608 and 616 more closely represent the actual distances in the scene, and the spread-arms pose in 616 is discernible. Thus, the use of SSL in combination with beamforming may help to determine depths at angular pixels more reliably than with the use of beamforming alone. Further, the use of post-receipt transmit beamforming may help to ultrasound-based depth imaging may be a lower-power alternative for human-computer interactions compared to light-based depth imaging.

The methods and processes described herein may be tied to a computing system of one or more computing devices, such as computing device 20 depicted in FIG. 2. In particular, such methods and processes may be implemented as a computer-application program or service, an application-programming interface (API), a library, and/or other computer-program product.

Figure 7:
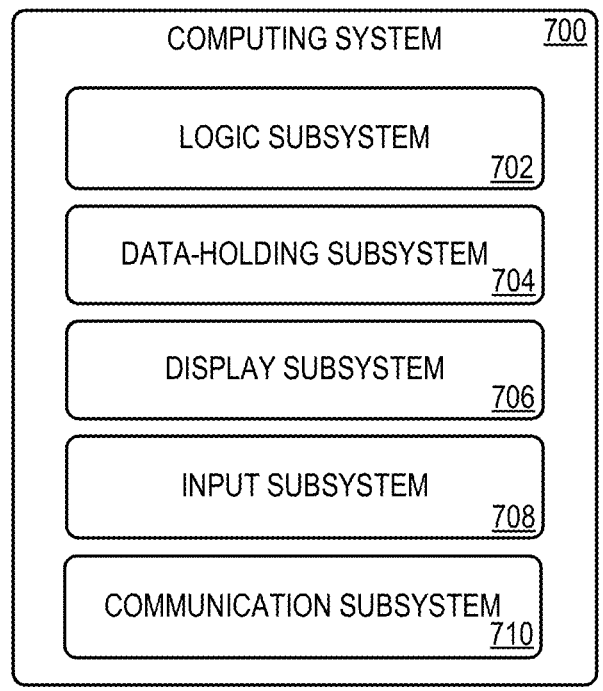
FIG. 7 shows a block diagram of an example computing device.

FIG. 7 schematically shows a non-limiting embodiment of a computing system 700 that may enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic subsystem 702 and a data-holding subsystem 704. Computing system 700 may optionally include a display subsystem 706, input subsystem 708, communication subsystem 708, and/or other components not shown in FIG. 7. Computing system 700 may also optionally include user input devices such as keyboards, mice, cameras, microphones, and/or touch screens, for example.

Logic subsystem 702 may include one or more physical devices configured to execute instructions. For example, logic subsystem 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 702 may include one or more processors configured to execute software instructions. Additionally or alternatively, logic subsystem 702 may include one or more hardware or firmware logic machines configured to execute hardware or firmware instructions. Processors of logic subsystem 702 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of logic subsystem 702 may be virtualized and executed by remotely accessible, networked computing devices configured in a cloud-computing configuration.

Data-holding subsystem 704 may include one or more physical devices configured to hold instructions executable by logic subsystem 702 to implement the methods and processes described herein. When such methods and processes are implemented, the state of data-holding subsystem 704 may be transformed—e.g., to hold different data.

Data-holding subsystem 704 may include removable and/or built-in devices. Data-holding subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data-holding subsystem 704 may include volatile, nonvolatile, dynamic, static, read/write, read-only, random-access, sequential-access, location-addressable, file-addressable, and/or content-addressable devices.

It will be appreciated that data-holding subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and data-holding subsystem 704 may be integrated together into one or more hardware-logic components. Such hardware-logic components may include field-programmable gate arrays (FPGAs), program- and application-specific integrated circuits (PA-SIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic subsystem 702 executing instructions held by data-holding subsystem 704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by data-holding subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or data-holding subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition;

an infrared, color, stereoscopic, and/or depth camera for machine vision and/or gesture recognition; an acoustic depth sensor (e.g. an ultrasonic depth sensor) for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

Another example provides an ultrasonic depth sensing system, comprising a transducer array comprising a plurality of transducers, a microphone array comprising a plurality of microphones, and a computing device comprising a logic subsystem and a storage subsystem including instructions executable by the logic subsystem to control the ultrasonic depth sensing system to, for an image frame, emit an ultrasonic pulse from each of a plurality of transducers, for each ultrasonic pulse, receive a reflection of the ultrasonic pulse at a microphone array, perform transmit beamforming and receive beamforming computationally after receiving the reflections, form a depth image based upon echoes detected by the receive beamforming, and output the depth image for the image frame. In this example, the instructions may additionally or alternatively include be executable to emit the ultrasonic pulse from each of the plurality of transducers by timing emission of the ultrasonic pulses based upon a frequency of the ultrasonic pulses. The instructions also may be additionally or alternatively executable to perform transmit beamforming by computing transmit beams for each pixel of the depth image after receipt of each reflection of each ultrasonic pulse from all of the plurality of transducers. The instructions also may be additionally or alternatively executable to emit the ultrasonic pulse from each of the plurality of transducers by emitting a single ultrasonic pulse from each transducer for the image frame. The instructions also may be additionally or alternatively executable to detect one or more echoes, perform receive beamforming on the one or more echoes, for a selected echo of the one or more echoes, perform sound source localization using a reflection corresponding to the selected echo, compare a direction determined by the sound source localization to a direction of the receive beamforming, and determine a depth value for a pixel of the depth image based upon the direction of the receive beamforming and the direction determined via the sound source localization. The instructions also may be additionally or alternatively executable to detect the one or more echoes by detecting a plurality of echoes from the direction of the receive beamforming and determining a candidate list of echoes from the plurality of echoes based upon strength, and wherein the selected echo is from the candidate list of echoes. The instructions also may be additionally or alternatively executable to determine depth values for two or more echoes of the candidate list of echoes, and if the two or more echoes of the candidate list are from directions within a threshold distance of the direction of the receive beamforming, then assign the depth value to the pixel of the depth image by assigning a smallest depth value of the two or more echoes that are from directions within the threshold distance. The instructions also may be additionally or alternatively executable to determine depth values for a plurality of pixels of the depth image. Any or all of the above-described examples may be combined in any suitable manner in various implementations.

Another example provides a method of ultrasonic depth sensing, comprising, for an image frame, emitting an ultrasonic pulse from each of a plurality of transducers; for each ultrasonic pulse, receiving a reflection of the ultrasonic pulse at a microphone array; performing receive beamforming to detect one or more echoes from a direction determined by the receive beamforming; for a selected echo of the one or more echoes, performing sound source localization using a reflection corresponding to the selected echo comparing a direction determined by the sound source localization to the direction determined by the receive beamforming; assigning a depth value determined for the selected echo to a pixel of a depth image if the direction determined by the sound source localization is within a threshold distance of the direction determined by the receive beamforming; an outputting the depth image for the image frame. The method may alternatively or additionally include detecting a plurality of echoes and determining a candidate list of echoes from the plurality of echoes, wherein the selected echo is selected from the candidate list of echoes. The method may alternatively or additionally include determining depth values for two or more echoes of the candidate list of echoes. The method may alternatively or additionally include, if the two or more echoes of the candidate list of echoes are from directions within the threshold distance, then assigning the depth value to the pixel of the depth image comprises assigning a smallest depth value of the two or more echoes. The method may alternatively or additionally include not assigning the depth value to the pixel of the depth image if the direction determined by the sound source localization is not within the threshold distance of the direction determined by the receive beamforming. The method may alternatively or additionally include performing receive beamforming for each direction of an array of directions to determine depth values for a plurality of pixels of a depth image. The method may alternatively or additionally include performing transmit beamforming after receiving the reflection of all ultrasonic pulses for the image frame at the microphone array. The method may alternatively or additionally include timing an emission of the ultrasonic pulses based upon a frequency of the ultrasonic pulses. The method may alternatively or additionally include emitting a single ultrasonic pulse from each transducer for the image frame. Any or all of the above-described examples may be combined in any suitable manner in various implementations.

Another example provides a method of ultrasonic depth sensing, comprising, for an image frame, emitting an ultrasonic pulse from each of a plurality of transducers; for each ultrasonic pulse, receiving a reflection of the ultrasonic pulse at a microphone array; performing transmit beamforming after receiving the reflection of all ultrasonic pulses for the image frame at the microphone array; performing receive beamforming to detect one or more echoes from a direction of the receive beamforming; for a selected echo of the one or more echoes, performing sound source localization using a reflection corresponding to the selected echo; comparing a direction determined by the sound source localization to the direction of the receive beamforming; assigning a depth value determined for the selected echo to a pixel of a depth image if the direction determined by the sound source localization is within a threshold distance of the direction of the receive beamforming; not assigning the depth value to the pixel if the direction determined by the sound source localization is not within the threshold distance of the direction of the receive beamforming; and outputting the depth image for the image frame. The method may alternatively or additionally include detecting a plurality of echoes from the direction of the receive beamforming and determining a candidate list of echoes from the plurality of echoes based upon strength, and wherein the selected echo is selected from the candidate list of echoes. The method may further include determining depth values for two or more echoes of the candidate list of echoes, wherein if the two or more echoes of the candidate list are from directions within the threshold distance, then assigning the depth value to the pixel of the depth image comprises assigning a smallest depth value of the two or more echoes that are from directions within the threshold distance. Any or all of the above-described examples may be combined in any suitable manner in various implementations.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An ultrasonic depth sensing system configured to output a depth image, the ultrasonic depth sensing system comprising
   a transducer array comprising a plurality of transducers;
   a microphone array comprising a plurality of microphones; and
   a computing device comprising a logic subsystem and a storage subsystem including instructions executable by the logic subsystem to control the ultrasonic depth sensing system to,
   for an image frame,
     emit an ultrasonic pulse from each of a plurality of transducers,
     for each ultrasonic pulse, receive a reflection of the ultrasonic pulse at a microphone array, wherein receiving the reflection comprises receiving one or more echoes corresponding to the reflection,
     perform transmit beamforming and receive beamforming computationally after receiving the reflections,
     form the depth image based upon echoes detected by the receive beamforming, wherein forming the depth image comprises, for a selected echo, performing sound source localization and comparing a direction determined by the sound source localization to a direction of the receive beamforming, and assigning a depth value determined for the selected echo to a pixel of a depth image if the direction determined by the sound source localization is within a threshold distance of the direction determined by the receive beamforming; and
   output the depth image for the image frame.

2. The system of claim 1, wherein the instructions are executable to emit the ultrasonic pulse from each of the plurality of transducers by timing emission of the ultrasonic pulses based upon a frequency of the ultrasonic pulses.

3. The system of claim 1, wherein the instructions are executable to perform transmit beamforming by computing transmit beams for each pixel of the depth image after receipt of each reflection of each ultrasonic pulse from all of the plurality of transducers.

4. The system of claim 1, wherein the instructions are executable to emit the ultrasonic pulse from each of the plurality of transducers by emitting a single ultrasonic pulse from each transducer for the image frame.

5. The system of claim 1, wherein the instructions are executable to detect the one or more echoes by detecting a plurality of echoes from the direction of the receive beamforming and determining a candidate list of echoes from the plurality of echoes based upon strength, and wherein the selected echo is from the candidate list of echoes.

6. The system of claim 5, wherein the instructions are executable to determine depth values for two or more echoes of the candidate list of echoes, and if the two or more echoes of the candidate list are from directions within a threshold distance of the direction of the receive beamforming, then assign the depth value to the pixel of the depth image by assigning a smallest depth value of the two or more echoes that are from directions within the threshold distance.

7. The system of claim 1, wherein the instructions are further executable to determine depth values for a plurality of pixels of the depth image.

8. A method of ultrasonic depth sensing, comprising:
   for an image frame,
     emitting an ultrasonic pulse from each of a plurality of transducers;
     for each ultrasonic pulse, receiving a reflection of the ultrasonic pulse at a microphone array;
     performing receive beamforming to detect one or more echoes from a direction determined by the receive beamforming;
     for a selected echo of the one or more echoes, performing sound source localization using a reflection corresponding to the selected echo;
     comparing a direction determined by the sound source localization to the direction determined by the receive beamforming;
     assigning a depth value determined for the selected echo to a pixel of a depth image if the direction determined by the sound source localization is within a threshold distance of the direction determined by the receive beamforming; and
     outputting the depth image for the image frame.

9. The method of claim 8, wherein detecting the one or more echoes comprises detecting a plurality of echoes and determining a candidate list of echoes from the plurality of echoes, and wherein the selected echo is selected from the candidate list of echoes.

10. The method claim 9, further comprising determining depth values for two or more echoes of the candidate list of echoes.

11. The method of claim 10, wherein if the two or more echoes of the candidate list of echoes are from directions within the threshold distance, then assigning the depth value to the pixel of the depth image comprises assigning a smallest depth value of the two or more echoes.

12. The method of claim 8, further comprising not assigning the depth value to the pixel of the depth image if the direction determined by the sound source localization is not within the threshold distance of the direction determined by the receive beamforming.

13. The method of claim 8, further comprising performing receive beamforming for each direction of an array of directions to determine depth values for a plurality of pixels of a depth image.

14. The method of claim 8, further comprising performing transmit beamforming after receiving the reflection of all ultrasonic pulses for the image frame at the microphone array.

15. The method of claim 8, wherein emitting the ultrasonic pulse from each of the plurality of transducers comprises timing an emission of the ultrasonic pulses based upon a frequency of the ultrasonic pulses.

16. The method of claim 15, wherein emitting the ultrasonic pulse from each of the plurality of transducers comprises emitting a single ultrasonic pulse from each transducer for the image frame.

17. A method of ultrasonic depth sensing, comprising:
for an image frame,
- emitting an ultrasonic pulse from each of a plurality of transducers;
- for each ultrasonic pulse, receiving a reflection of the ultrasonic pulse at a microphone array;
- performing transmit beamforming after receiving the reflection of all ultrasonic pulses for the image frame at the microphone array;
- performing receive beamforming to detect one or more echoes from a direction of the receive beamforming;
- for a selected echo of the one or more echoes, performing sound source localization using a reflection corresponding to the selected echo;
- comparing a direction determined by the sound source localization to the direction of the receive beamforming;
- assigning a depth value determined for the selected echo to a pixel of a depth image if the direction determined by the sound source localization is within a threshold distance of the direction of the receive beamforming;
- not assigning the depth value to the pixel if the direction determined by the sound source localization is not within the threshold distance of the direction of the receive beamforming; and
- outputting the depth image for the image frame.

18. The method of claim 17, wherein detecting the one or more echoes comprises detecting a plurality of echoes from the direction of the receive beamforming and determining a candidate list of echoes from the plurality of echoes based upon strength, and wherein the selected echo is selected from the candidate list of echoes.

19. The method of claim 18, further comprising determining depth values for two or more echoes of the candidate list of echoes, wherein if the two or more echoes of the candidate list are from directions within the threshold distance, then assigning the depth value to the pixel of the depth image comprises assigning a smallest depth value of the two or more echoes that are from directions within the threshold distance.

* * * * *